Aug. 12, 1947.  A. ZEITLIN ET AL  2,425,410
OIL SEPARATOR
Filed Feb. 3, 1945  2 Sheets-Sheet 1
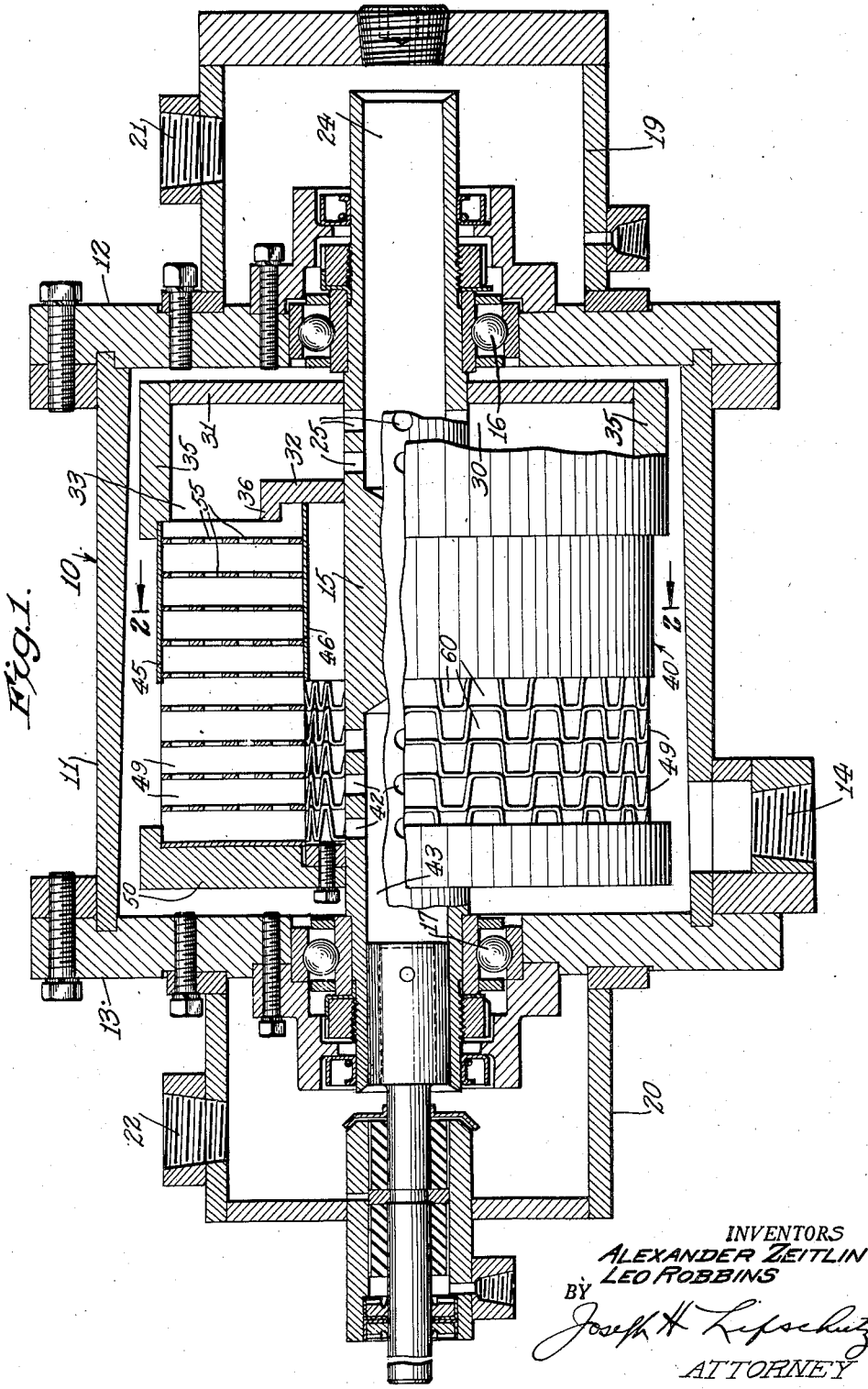
INVENTORS
ALEXANDER ZEITLIN
LEO ROBBINS
BY
Joseph H. Lipschutz
ATTORNEY Aug. 12, 1947.  A. ZEITLIN ET AL  2,425,410

OIL SEPARATOR

Filed Feb. 3, 1945   2 Sheets-Sheet 2

INVENTORS
ALEXANDER ZEITLIN
LEO ROBBINS
BY Joseph H. Lipschutz
ATTORNEY

Patented Aug. 12, 1947

2,425,410

UNITED STATES PATENT OFFICE 2,425,410

OIL SEPARATOR

Alexander Zeitlin and Leo Robbins,
New York, N. Y.

Application February 3, 1945, Serial No. 576,084

4 Claims. (Cl. 183—77)

This invention relates to separators which are designed to separate liquid particles from a compressed gas in which they are suspended. More particularly, the invention relates to oil separators for compressed air generators, and the invention has for its object the provision of a separator which will effectively remove suspended oil particles from the compressed air. It is well known that the presence of oil in compressed air constitutes a major problem since in many uses of the air so compressed the presence of even small quantities of suspended oil is highly undesirable and injurious. Various means have been proposed for effecting such separation, but none of these has been wholly efficient and satisfactory. Among the latter are various forms of rotating cylinders through which the air and oil mixture is adapted to be passed on the theory that the centrifugal force of the rotating cylinder will cause the particles of liquid to be thrown off because their mass is heavier than that of the compressed air. While a certain amount of oil separation has been obtained with a rotating separator, complete separation was found to be impossible. The reason for this condition is to be found in the fact that in the types of oil separator heretofore used, the mixture of compressed air and oil entered the rotating separator radially from the periphery inwardly. As a result, the path of the incoming mixture was opposed to the path of the discharged oil, and this conflict prevented complete separation of the oil. It is therefore a principal object of this invention to provide an oil separator of the centrifugal type wherein separate, non-interfering paths are provided for the incoming mixture, the separated oil and the separated air.

One form of separator heretofore used consisted of foranimous material. Insufficient separation of oil from air was obtained by the use of such separators not only by reason of the conflicting entering and discharge paths, as described above, but also by reason of the structure of the foraminous material itself out of which the separator is formed. Such material consists of a large number of cellular components heterogeneously arranged so that the air and oil mixture passing through the material was broken up into extremely small bubbles. This created turbulence which prevented the centrifugal force from acting on the oil, and thus prevented separation of the oil from the air.

It is therefore another object of this invention to provide an oil separator which acts upon the principle of centrifugal force and which provides means which will permit the centrifugal force to exert its maximum effect upon the oil in the mixture. To this end a separator is provided which, instead of breaking up the path of the air and oil mixture into such small elements as to create turbulence, permits the mixture to flow in continuous, unbroken streams.

Further objects and advantages of this invention will become apparent in the following detailed description thereof.

In the accompanying drawings,

Fig. 1 is a partial vertical section through a separator assembly showing one form of this invention.

Figure 4:
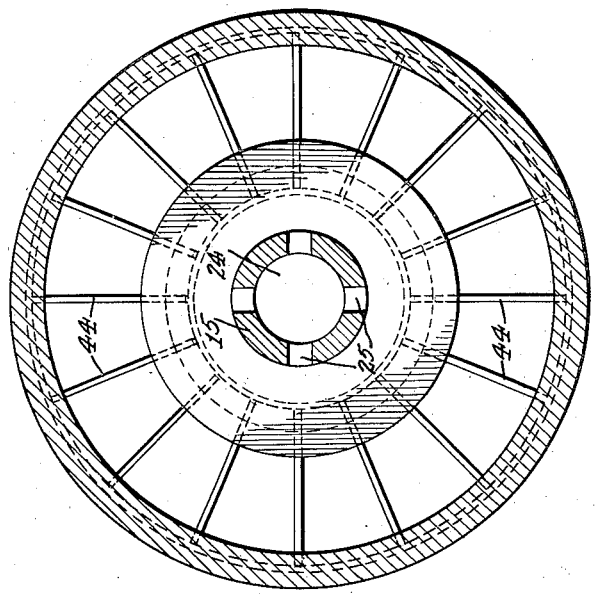
Fig. 4 is a section taken substantially on the line 4—4 of Fig. 3.

Referring to Fig. 1, the invention is illustrated in the form of an oil separator for separating oil from a mixture of compressed air and oil, but it will be apparent that the invention has general application to the separation of liquids from compressed gases in which the liquid is suspended. The oil separator shown comprises a housing 10 which consists of an outer wall 11 and end walls 12 and 13. The housing is closed except for an outlet 14 for the separated oil, and except for openings in the end walls through which extends the driven shaft 15 supported in bearings 16 and 17 properly sealed against escape of fluid from the housing. The bearings are enclosed in housings 19 and 20 which are sealed except for an inlet 21 for the compressed air and oil mixture and an outlet 22 for the compressed air.

The end of shaft 15 which extends into housing 19 is hollow, as shown at 24, and open at its end, the hollow interior communicating through ports 25 with the interior of housing 10. The compressed air and oil mixture is thus led from inlet port 21 through the hollow, open end of shaft 15, and thence by ports 25 into the oil separator housing 10.

The oil separator chamber comprises a radially-extending passage 30 formed by walls 31 and 32, the said passage 30 communicating with an annular, axially-extending passage 33 formed by making wall 31 of larger diameter than wall 32, and providing wall 31 with an annular outer wall 35 and providing wall 32 with an annular projection 36. It is now apparent that the compressed air and oil mixture will enter passage 30 radially but will be directed into axially-extending passage 33. It is while travelling in this axial direction that the compressed air and oil mixture enters the rotating, centrifugal element indicated generally at 40. This represents a radical departure from the centrifugal oil separators heretofore employed wherein the air and oil mixture entered the centrifugal element radially while the separated oil tended to move in the opposite radial direction. This prevented complete and effective separation of the oil. By delivering the air and gas mixture to the centrifugal separator axially, it is possible to provide separate paths for the incoming mixture, the separated oil and the separated air.

While the advantage of separate paths obtained by delivering the mixture to the centrifugal element 40 axially will increase the efficiency of all types of separators, maximum efficiency of separation would nevertheless not be obtained if the rotating, centrifugal element were of the foraminous type which broke up the entering streams into minute bubbles, thus causing turbulence and foaming which would prevent the centrifugal force from acting effectively on the heavier oil. Therefore, it is desirable that the centrifugal element 40 provide for continuous, unbroken paths for the streams of the mixture entering the element axially, while at the same time providing radial paths for the separated oil and air.

Figure 3:
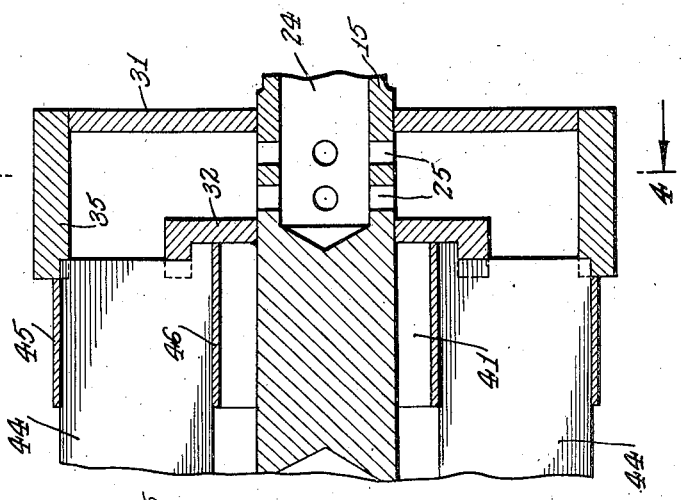
Fig. 3 is a view similar to Fig. 1, showing a modified form of this invention.

The simplest embodiment of the principles of this invention is disclosed in Figs. 3 and 4, wherein the centrifugal element is shown as composed of a plurality of vanes 44, the plane of each vane including the axis of shaft 15. The vanes are angularly spaced around a complete circle, as shown in Fig. 4, and the vanes are spaced from the shaft 15 to form a discharge passage 41 for the compressed air. The mixture entering the spaces between adjoining vanes will move axially in uninterrupted, unbroken streams. Since the mass of oil is thus not broken up into minute particles and mixed with air, no turbulence or foaming will be set up, and the centrifugal force will be able to exert its full effect on the oil to separate it from the air. The oil thus separated is thrown off radially, and, since the mixture does not enter the space between the vanes radially, the oil has an independent, unopposed and separate path from that of the entering mixture so that the maximum separation is possible. The separated oil is thrown against the outer wall 11 and is discharged through port 14 to an oil reservoir. The air under pressure also is discharged radially, but in a direction opposite to that of the separated oil. The air passes through ports 42 into the hollow interior 43 of shaft 15 and thence discharges through outlet 22.

To permit the centrifugal force to act on the mixture for at least a predetermined time after the mixture enters the separator 40, an outer cover 45 may be provided for the vanes, extending part way from the entering side of the separator. Similarly, an inner cover 46 may be provided, extending part way from the entering side of the separator, to insure passage of the mixture through the filter for at least a predetermined time after the mixture enters the separator, thus increasing the amount of the mixture passing through the separator, and, therefore, rendering the separation more effective.

The vanes may be supported in any suitable manner, as, for instance, by fastening them in slots and the end projections 35 and 36 and end wall 50 fixed to the shaft.

Figure 2:
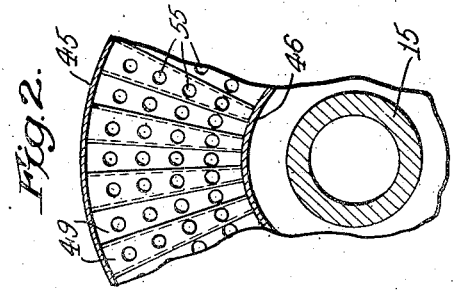
Fig. 2 is a portion of one of the corrugated elements of Fig. 1.

Another form of the invention is disclosed in Figs. 1 and 2 and has the advantages of easier construction and assembly. It consists of a plurality of similar corrugated discs 49 which, when assembled, form radial passages 60 between adjacent discs. The discs are provided in their faces with aligned openings 55 to form continuous axial paths for the streams of the mixture while the oil is discharged by way of the non-opposing radial passages 60. The separated compressed air is discharged radially by way of passages 60 in the opposite direction, and thence by way of ports 42 to the outlet 22.

In assemblying the centrifugal element of Figs. 1 and 2, it is only necessary to stack the corrugated elements and align them with bolts which also serve to fix the assembled centrifugal element in position between end walls 31, 32 and 50.

In accordance with the provisions of the patent statutes, we have herein described the principle and operation of our invention, together with the apparatus which we now consider to represent the best embodiment thereof, but we desire to have it understood that the apparatus shown is only illustrative, and that the invention can be carried out by other equivalent means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. A separator for separating a liquid from a compressed gas, comprising a centrifugal element rotatable about an axis, and means for delivering the gas and liquid mixture to the element axially thereof, said element comprising a plurality of corrugated discs joined to form radial passages open at their outer and inner ends, said discs having axially aligned openings to provide continuous passages therethrough for the gas and liquid mixture in a direction substantially parallel to the axis of rotation.

2. A separator for separating a liquid from a compressed gas, comprising a centrifugal element rotatable about an axis, said element having continuous axial passages and continuous radial passages therein, said radial passages being open at their ends to provide outlets for the separated liquid and the compressed gas, means for delivering the gas and liquid mixture to the element axially thereof, and means for closing the outlets for the separated liquid for a predetermined distance axially from the point where the mixture enters said element.

3. A separator for separating a liquid from a compressed gas, comprising a centrifugal element rotatable about an axis, said element having continuous axial passages and continuous radial passages therein, said radial passages being open at their ends to provide outlets for the separated liquid and the compressed gas, means for delivering the gas and liquid mixture to the element axially thereof, and means for closing the outlets for the separated air for a predetermined distance axially from the point where the mixture enters said element.

4. A separator for separating a liquid from a compressed gas, comprising a centrifugal element rotatable about an axis, said element having continuous axial passages and continuous radial passages therein, said radial passages being open at their ends to provide outlets for the separated liquid and the compressed gas, means for delivering the gas and liquid mixture to the element axially thereof, and means for closing the outlets for the separated liquid and for the separated air for a predetermined distance axially from the point where the mixture enters said element.

ALEXANDER ZEITLIN.
L. ROBBINS.

REFERENCES CITED

The following references are of record in the file of this patent:

UNITED STATES PATENTS

| Number | Name | Date |
|---|---|---|
| 1,505,564 | Jett | Aug. 19, 1924 |
| 165,785 | Braun | July 20, 1875 |
| 1,393,335 | Baldwin | Oct. 11, 1921 |
| 1,876,002 | Harper | Sept. 6, 1932 |

FOREIGN PATENTS

| Number | Country | Date |
|---|---|---|
| 329,661 | Germany | Nov. 27, 1920 |
| 132,586 | Great Britain | Sept. 25, 1919 |